United States Patent
Yamazaki et al.

(10) Patent No.: US 7,637,533 B2
(45) Date of Patent: Dec. 29, 2009

(54) GAS GENERATOR

(75) Inventors: Masayuki Yamazaki, Tatsuno (JP); Shogo Tomiyama, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 280 days.

(21) Appl. No.: 11/626,773

(22) Filed: Jan. 24, 2007

(65) Prior Publication Data

US 2007/0182141 A1    Aug. 9, 2007

Related U.S. Application Data

(60) Provisional application No. 60/763,918, filed on Feb. 1, 2006.

(30) Foreign Application Priority Data

Jan. 25, 2006    (JP)    ............................. 2006-015757

(51) Int. Cl.
B60R 21/26    (2006.01)

(52) U.S. Cl. ...................... 280/736; 280/735; 280/741; 280/742

(58) Field of Classification Search .................. 280/735, 280/736, 741, 742
See application file for complete search history.

(56) References Cited

U.S. PATENT DOCUMENTS

| 3,434,426 | A | * | 3/1969 | De Dapper | ............... 102/202.8 |
| 5,101,730 | A | | 4/1992 | Bender et al. | |
| 5,368,329 | A | | 11/1994 | Hock | |
| 5,482,315 | A | * | 1/1996 | Chandler et al. | ............. 280/741 |
| 5,487,559 | A | * | 1/1996 | Headley | ....................... 280/735 |
| 5,518,807 | A | * | 5/1996 | Chan et al. | ............... 428/305.5 |
| 5,551,343 | A | * | 9/1996 | Hock et al. | .................. 102/288 |
| 5,578,787 | A | | 11/1996 | Kobari et al. | |
| 5,620,205 | A | | 4/1997 | Lauritzen et al. | |
| 5,682,013 | A | * | 10/1997 | Smith et al. | ..................... 149/6 |
| 5,683,104 | A | * | 11/1997 | Smith | ......................... 280/736 |
| 5,695,215 | A | * | 12/1997 | Headley et al. | ............. 280/737 |
| 5,821,446 | A | * | 10/1998 | Chatley, Jr. | ............... 102/202.7 |
| 5,876,062 | A | * | 3/1999 | Hock | ......................... 280/736 |
| 6,053,110 | A | | 4/2000 | Marchant et al. | |
| 6,077,372 | A | * | 6/2000 | Mendenhall et al. | ...... 149/109.6 |
| 6,272,992 | B1 | * | 8/2001 | Chatley, Jr. | ............... 102/202.5 |
| 6,431,594 | B1 | * | 8/2002 | Swann et al. | ................. 280/735 |
| 6,454,887 | B1 | | 9/2002 | Yamato et al. | |
| 6,497,774 | B2 | | 12/2002 | Yamato et al. | |
| 6,527,886 | B1 | | 3/2003 | Yamato et al. | |
| 6,553,914 | B2 | * | 4/2003 | Hosey et al. | ................. 102/530 |

(Continued)

FOREIGN PATENT DOCUMENTS

JP    2002-204947 A    7/2002

*Primary Examiner*—Paul N. Dickson
*Assistant Examiner*—Barry Gooden, Jr.
(74) *Attorney, Agent, or Firm*—Birch, Stewart, Kolasch & Birch, LLP

(57) ABSTRACT

A gas generator includes:
  a housing having a gas discharge port;
  a molded article of gas generating composition disposed within the housing and generating gas on combustion, the molded article of the gas generating composition having a single or plural combustion starting end surfaces where ignition and combustion is started by the ignition means;
  ignition means provided within the housing and igniting and burning the molded article of the gas generating composition; and
  the ignition means being a surface heating element which is in contact with the combustion starting end surface.

13 Claims, 2 Drawing Sheets

U.S. PATENT DOCUMENTS

| | | |
|---|---|---|
| 6,619,692 B2 * | 9/2003 | Van Wynsberghe et al. .. 280/741 |
| 6,644,206 B2 * | 11/2003 | Fogle, Jr. ..................... 102/530 |
| 6,705,642 B1 * | 3/2004 | Serban et al. ............... 280/739 |
| 7,021,217 B2 * | 4/2006 | Desai et al. .............. 102/202.5 |
| 2002/0140217 A1 * | 10/2002 | Wynsberghe et al. ....... 280/741 |
| 2003/0006594 A1 * | 1/2003 | Bergerson et al. ........... 280/736 |
| 2003/0038463 A1 * | 2/2003 | Stonich et al. .............. 280/733 |
| 2004/0227337 A1 * | 11/2004 | Ruckdeschel et al. ....... 280/736 |
| 2007/0182141 A1 | 8/2007 | Yamazaki et al. |
| 2007/0251616 A1 * | 11/2007 | Furusawa et al. ............. 149/37 |
| 2008/0116671 A1 * | 5/2008 | Takahashi ................... 280/735 |

* cited by examiner

GAS GENERATOR

This nonprovisional application claims priority under 35 U.S.C. § 119(a) on Patent Application No. 2006-15757 filed in Japan on 25 Jan. 2006 and 35 U.S.C. § 119(e) on U.S. Provisional Application No. 60/763918 filed on 1 Feb. 2006, which are incorporated by reference.

BACKGROUND OF INVENTION

1. Field of Invention

The present invention relates to a gas generator suitable for airbag systems installed in automobiles and occupant restraining devices for use in pedestrian protection devices.

2. Description of Related Art

In order to accurately control combustion of a gas generating agent, a device has been made such that a combustion surface area and an amount of generated gas is controlled by molding a gas generating agent into a single-perforated shape, pellet or disk.

In the gas generator disclosed in JP-A No. 2002-204947, the gas generating agent burns from end surface. Thus, by igniting the end surface of the gas generating agent with an igniter, the end surface combustion proceeds in the direction shown by the arrow in FIG. 1, the generated gas is released from the circulation hole via a flow rate control valve into a gas circulation tube and ejected from the gas circulation tube to the outside. In such a gas generator, the combustion is started by an igniter 11. The igniter 11 is disposed opposite to the combustion end surface (exposed end surface) 10a of the gas generating agent 10, and the size of the ignition portion of the igniter 11 is small by comparison with the area of the combustion end surface 10a.

SUMMARY OF INVENTION

The present invention provides a gas generator, including a housing having a gas discharge port, a molded article for generating gas on combustion, ignition means for igniting and burning the molded article of the gas generating composition, the molded article of the gas generating composition and the ignition means being disposed in the housing, the molded article of the gas generating composition having a single or plural combustion starting end surfaces where ignition and combustion is started by the ignition means, the ignition means being a surface heating element, the combustion starting end surface being in contact with the surface heating element.

In other words, the invention provides a gas generator, including:

a housing having a gas discharge port;

a molded article of gas generating composition disposed within the housing and generating gas on combustion, the molded article of the gas generating composition having a single or plural combustion starting end surfaces where ignition and combustion is started by the ignition means;

ignition means provided within the housing and igniting and burning the molded article of the gas generating composition, the ignition means being a surface heating element which is in contact with the combustion starting end surface.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
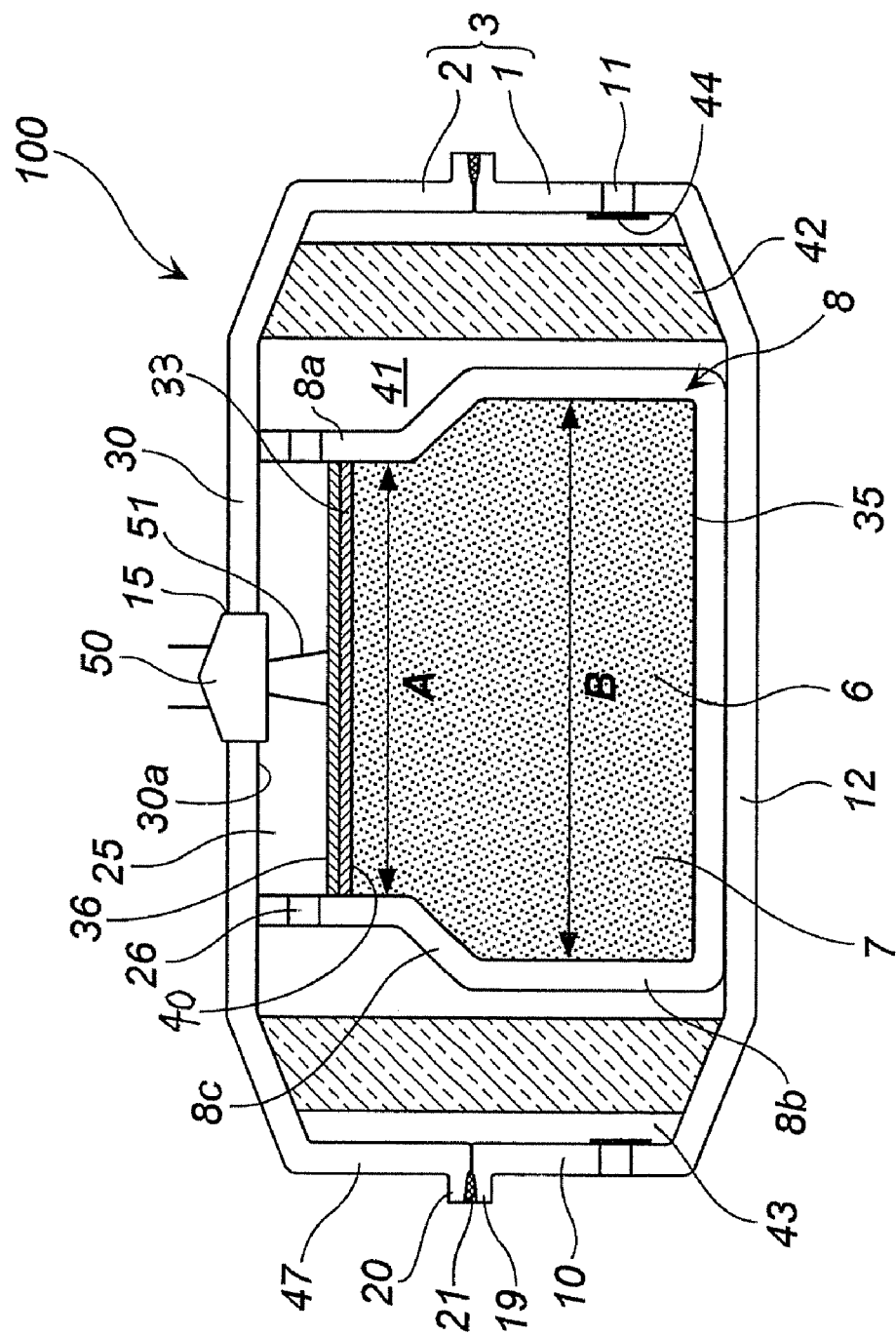
FIG. 1 shows a cross-sectional view of a gas generator for an air bag of a preferred embodiment.

It is considered that, because ignition and combustion can be easily started on the combustion end surface in the portion close to the igniter, the combustion can proceed unevenly in the state of arts. Furthermore, when the physical strength of the gas generating agent is low, the ignition surface is cracked and deformed by an impact produced by the igniter and uniform ignition and combustion are inhibited. As a result, the amount of generated gas changes and the desired performance sometimes cannot be ensured.

The present invention provides a gas generator including a molded article of the gas generating composition of an end surface combustion type, in which the performance thereof is easy to adjust and the reproducibility of the performance is improved.

Most of known gas generators have a large number of molded articles of gas generating composition loaded therein and have as a whole a large surface area. Therefore, when the ignition means is actuated and combustion is initiated, basically a full-surface combustion proceeds.

On the other hand, in the gas generator in accordance with the present invention, the molded article of the gas generating composition has a combustion starting end surface and the combustion is initiated and proceeds from the combustion starting end surface. Accordingly, the difference is that partial combustion proceeds, by contrast with the aforementioned full-surface combustion.

The molded article of the gas generating composition in accordance with the present invention may be a single molded article of the gas generating composition or may be formed by combining a plurality of molded articles of gas generating composition to make a single article as a whole, but a single molded article of the gas generating composition is preferred. The shape of the single molded article of the gas generating composition preferably matches the internal shape of the space (for example, an inner wall of a housing, an inner wall of a filter, or a combustion chamber surrounded by a partition wall or another container disposed inside the housing if required) to be filled with the molded article of the gas generating composition.

When a combination of a plurality of molded articles of the gas generating composition is used, the number the molded articles is preferably 10 or less, more preferably 2 to 8, even more preferably 2 to 6, and especially preferably 2 to 4. No specific limitation is placed on the shape of individual molded articles of gas generating composition and they can have a known shape such as a cylinder, disk, or a cylinder or disk that has a through hole or a non-through hole (recess).

When a combination of a plurality of molded articles of gas generating composition are used, the entire shape thereof preferably matches the internal shape of the space (for example, the aforementioned combustion chamber) to be filled with the molded article of the gas generating composition. For example, a plurality of disk-like molded articles of the gas generating composition can be stacked so that as a whole they match the internal shape of the space (for example, the aforementioned combustion chamber) to be filled with the molded articles of the gas generating composition.

Because the molded article of the gas generating composition is loaded in a state of contact with an inner wall surface of a housing, inner wall surface of a filter, and inner wall surface of a partition wall or another container disposed inside the housing if required, the surface, which is open, not in contact with those inner wall surfaces, and that is to be ignited and combusted by the ignition means (surface heating element), serves as the combustion starting end surface. When the combustion starting end surface is ignited and caused to combust and the combustion proceeds thereon, the combustion can hardly proceed from the surface of the molded article of the gas generating composition that is contact with the aforementioned inner wall surfaces.

The combustion starting end surface can be single or plural by adjusting the above-described contact state with the inner wall of the housing, inner wall of the filter, and inner wall of the partition wall or another container disposed inside the housing if required. The combustion starting end surface may be a flat or curved surface, a flat or curved surface being uneven, and a flat or curved surface having a hole (through hole or recess).

The surface heating element is used in place of the ignition means (electric igniter) that has been used in the conventional gas generators. This body is disposed in a state of contact with the combustion starting end surface. The surface heating element is connected via a conductor to a power source.

The area of the ignition portion of the electric igniters that are generally used is sufficiently smaller than the area of the combustion starting end surface. Therefore, when the electric igniter is actuated, a small portion of the molded article of the gas generating composition is ignited. For this reason, if the combustion starting end surface is large, there is a case of the ignition with non-uniform and the combustion proceeding in a non-uniform manner.

Further, there is also a case that the molded article of the gas generating composition is fractured or deformed by the flame generated by the actuation of the electric igniter or pressure of the high-temperature gas, and when such fracture or deformation occurs, there is a possibility of the ignition with non-uniform and the combustion proceeding in a non-uniform manner.

However, if the surface heating element is used instead of the conventional electric igniter, as in the present invention, the combustion starting end surface of the molded article of the gas generating composition does not receive pressure. Therefore, no deformation, etc., can occur and the entire body is ignited and combusted uniformly. Further, by using the surface heating element, the weight of the entire gas generator can be reduced by comparison with that in the case where the electric ignited is used.

Further, the present invention preferably provides the gas generator, wherein the molded article of the gas generating composition is covered with a resin or a rubber partially or over the entire surface, except the combustion starting end surface.

When the molded article of the gas generating composition is thus covered with a resin or a rubber partially or over the entire surface, except the combustion starting end surface, the endurance of the molded article of the gas generating composition can be increased. The thickness of the covering material can be about 0.01 to 3 mm. Examples of the resin include phenolic resins, urea resins, melamine resins, unsaturated polyesters, poly(diallyl phthalates), epoxy resins, polyurethanes, polyimides, polyethylene, polypropylene, polystyrene, ABS resins, polyamides, poly(methyl methacrylates), polyoxymethylene, polycarbonates, polyethylene terephthalate, silicone resins, diallyl phthalate resins, dicyclopentadiene resins, polyphenylene ether, liquid-crystalline polymers, polyether ketones, polyamideimides, and polyetherimides.

Examples of the rubber include natural rubbers, isoprene rubber, butadiene rubber, butyl rubber, styrene-butadiene rubber, nitrile rubber, urethane rubber, ethylene-propylene rubber, acryl rubber, and silicone rubber.

Among them, polyimide is preferred because they demonstrate flexibility, resistance to melting, and fire resistance in a temperature range from −200° C. to more than 400° C. When a structure, in which the molded article of the gas generating composition is coated with such polyimide, is used in a gas generator for an airbag, the gas generator is sufficiently suitable for environmental testing (for example, a heat resistance test, assuming a closed cabin in the vehicle during summertime of a southern country).

Further, the present invention preferably provides the gas generator, wherein the molded article of the gas generating composition has a shape or structure with combustion surface area changing during the combustion.

"The shape or structure with a combustion surface area changing during the combustion" indicates a shape or a structure in which when combustion starts from the combustion starting end surface, the cross-sectional surface area changes with time, in the case of a single molded article of the gas generating composition, such as a molded article having one or two or more portions having different diameters, a molded article having one or two or more through holes having different diameters, a molded article having one or two or more non-through holes (recesses), a molded article having two or more non-through holes (recesses) of different depth, a molded article having a through hole and a non-through hole (recess), and a molded article having one or two or more hollow portions inside thereof. Furthermore, when a plurality of molded articles of the gas generating composition are combined, those having, as a whole, the shapes or structures mentioned above are presented as examples of such combination.

In the examples above, the cases having different diameters in the molded article of the gas generating composition or the through holes are presented, but cross-sectional shapes thereof are not limited to a round shape and may have a polygonal shape.

If a shape or structure is obtained in which the combustion surface area changes during combustion, then the variation of the amount of gas generated during combustion can be regulated. This is because if a shape or structure is produced in which the combustion surface area changes during combustion, the ignition and combustion surface area gradually expands or narrows or rapidly expands or narrows in the course of combustion and as the combustion surface area changes, the amount of generated gas per unit time can be changed.

For example, when assembled with an airbag, a gas generator for an airbag system is obtained in which the combustion surface area in the initial stage of combustion is decreased and the combustion surface area increases after the combustion proceeds for a predetermined period of time, whereby the amount of gas generated in the initial stage of actuation is inhibited and a large amount of gas is discharged after a predetermined interval elapses and, therefore, the impact on the vehicle occupant caused by airbag inflation can be relaxed.

Further, the present invention preferably provides the gas generator, wherein a gas discharge path leading to the gas discharge port is opened by a change in the surface heating element after the combustion starting end surface is ignited and combusted.

In the case in which the surface heating element is disposed between the filling space of the molded article of the gas generating composition and the gas discharge port, when the surface heating element remains after the combustion of the molded article of the gas generating composition, the gas discharge path leading to the gas discharge port is closed and gas discharge is hindered. For this reason, the gas discharge path leading to the gas discharge port is opened by the change in the surface heating element after the combustion starting end surface has been ignited and combusted. The "change" as referred to herein, for example, means burning out, fracture, deformation, or displacement.

From the standpoint of facilitating the deformation of the surface heating element, it is preferred that the thickness of the surface heating element be 0.01 to 1 mm, more preferably 0.03 to 0.5 mm.

Further, the present invention preferably provides the gas generator, wherein the surface heating element has plasticity and can deform in the thickness direction.

From the standpoint of reliable ignition and combustion of the entire combustion starting end surface of the molded article of the gas generating composition, it is preferred that the combustion starting end surface and surface heating element be in intimate contact with each other. If a member that has plasticity and can deform in the thickness direction, such as a metal foil, is used as the surface heating element, for example even when the combustion starting end surface is uneven, the surface heating element can be brought into intimate contact with the unevenness.

Further, the present invention preferably provides the gas generator, wherein the surface heating element is made from a material selected from nickel silicide, stainless steel foil, silicone rubber cord heater, electrically conductive rubber, composite ceramics based on titanium-based metal, carbon felt, synthetic rubber including electrically conductive carbon, and nichrome wire.

The surface heating element is preferably from stainless steel, nickel silicide, stainless steel foil+polyimide resin, stainless steel foil+polyester resin, silicone rubber cord heater+aluminum foil, and electrically conductive rubber, composite ceramics based on a titanium-based metal, a carbon felt configured into a thin film, a blend of a synthetic rubber and electrically conductive carbon, and a nichrome wire (nickel-chromium alloy wire) arranged in a meandering manner.

A configuration in which the stainless steel is formed into a thin-film shape to obtain a stainless steel foil and the exposed surface thereof is coated with a polyimide resin or polyester resin, and a configuration in which a silicone rubber cord heater is covered with an aluminum foil or the like can be used. A configuration in which an electrically conductive rubber has its own resistivity, in particular, a configuration using a silicon rubber with good heat resistance as the rubber is preferred.

A configuration composed of a composite ceramic based on a titanium-based metal can be obtained by dissolving a composite ceramic based on a titanium-based metal in a binder, then coating on an insulating material, and drying.

Further, the present invention preferably provides the gas generator, wherein the surface heating element has a shape identical or close to that of the combustion starting end surface.

In such case, the combustion starting end surface of the molded article of the gas generating composition can be ignited and combusted uniformly.

Further, the present invention preferably provides the gas generator, wherein an ignition enhancer is inserted between the surface heating element and the combustion starting end surface.

As the ignition enhancer, a film-like member having a transfer charge applied to one surface or both surfaces thereof, a porous thin-plate member impregnated with a black explosive such as boron potassium nitrate(boron niter), a solidified slurry-like substance including an explosive, or a gas generating agent having a combustion temperature higher than that of the molded article of the gas generating composition is brought into contact with and disposed on the combustion starting end surface. When a slurry-like substance is used, it may be coated and dried on the combustion starting end surface of gas generating agent.

The ignition enhancer can also function as reinforcing means that prevents the occurrence of abnormalities such as cracks and defects in the combustion starting end surface of the molded article of the gas generating composition due to impacts, e.g., when the gas generator falls down.

With the gas generator in accordance with the present invention, because the end-surface combustion is induced at the combustion starting end surface of the molded article of the gas generating composition, performance of the gas generator can be easily adjusted and performance of a gas generator is least varied.

Embodiments of Invention (1) Gas generator shown in FIG. 1

An embodiment of the present invention will be described below with reference to the drawings. FIG. 1 is a cross-sectional view in the axial direction (vertical direction) of the gas generator for an air bag, formed for a gas generator for an air bag for a driver side.

An outer shell of a gas generator 100 is formed by a housing 3 composed of a diffuser shell 1 and a closure shell 2.

The diffuser shell 1 is formed by pressing a steel sheet and has a annular portion 12, a circumferential wall portion 10 formed on the outer periphery of the annular portion 12, and a flange portion 19 extending outwardly in the radial direction at the distal end of the circumferential wall portion 10. A gas discharge port(s) 11 is/are formed equidistantly in the circumferential direction in the circumferential wall portion 10.

The closure shell 2 is formed by pressing a steel sheet and has a annular portion 30, a central hole 15 formed in the central portion thereof, a circumferential wall portion 47 formed on the outer periphery of the annular portion 30, and a flange portion 20 extending outwardly in the radial direction at the distal end of the circumferential wall portion 47. A relay connector 50 for relaying an ignition current from the outside is disposed in the central hole 15 and fixed by crimping.

The diffuser shell 1 and closure shell 2 are fixed by stacking the flange portions 19, 20 and welding 21 to each other.

A cup 8 is accommodated inside the housing 3, and the inside of the cup 8 serves as a combustion chamber 7. The cup 8 has a smaller-diameter portion 8a having a plurality of gas passage ports 26 on the circumference at the open end portion side, a larger-diameter portion 8b at the closed end portion side, and an inclined surface portion 8c in the intermediate portion between the smaller-diameter portion 8a and larger-diameter portion 8b. The outer diameter of the inclined surface portion 8c increases from the smaller-diameter portion 8a toward the larger-diameter portion 8b. In the cup 8, the open end portion abuts against the annular portion 30 of the closure shell 2, and the closed end portion abuts against the annular portion 12 of the diffuser shell 1.

A single molded article of the gas generating composition 6 formed to have a lump-like shape matching the inner shape of the cup 8 is accommodated in the combustion chamber 7. The molded article of the gas generating composition 6 is, with the exception of one surface thereof, in contact with the internal wall surface of the cup 8, and the end surface of the molded article of the gas generating composition on the closure shell 2 side that is the open surface serves as an combustion starting end surface 40.

The molded article of the gas generating composition 6 includes three portions with different outer diameters: a portion having an outer diameter A (portion corresponding to the smaller-diameter portion 8a), a portion having an outer diameter B (portion corresponding to the larger-diameter portion 8b), and an intermediate portion (portion corresponding to the inclined surface portion 8c) having an outer diameter between the outer diameter A and outer diameter B (in the case the outer diameter of the intermediate portion is taken as the mean value). The sizes of the cross portions of the portions satisfy the following relationships: the portion having an outer diameter A< the intermediate portion having an outer diameter between the outer diameter A and outer diameter B< the portion having an outer diameter B.

The molded article of the gas generating composition 6 has good ignition ability and is molded in accordance with the following method by using a composition including 40 mass % of a fuel (RDX), 57 mass % of an oxidizing agent (potassium perchlorate), and 3 mass % of a binder for molding (carboxymethyl cellulose sodium).

3 mass % of Carboxymethyl cellulose (CMC Daicel #2260, manufactured by Daicel Chemical Industries, Ltd.) is added to 50 mass % of ion-exchange water, and dissolved under stirring in a state where the liquid temperature is adjusted to 40° C. Then, 40 mass % of RDX (ground product, manufactured by Nippon Koki Co., Ltd.) and 57 mass % of potassium perchlorate (KPD2, manufactured by Japan Carlit Co., Ltd.) are added, followed by gradual stirring for an hour to be mixed uniformly.

The resultant mixture is left to be cooled to ambient temperature and a gel-like gas generating composition (water-containing substance) is obtained. This composition is charged into the space (space matching the shape of the molded article of the gas generating composition that is to be obtained) inside the cup 8. Then, drying is conducted for 24 hours at 110° C., and a cup 8 filled with the molded article of the gas generating composition 6 of desired shape can be obtained. Alternatively, the gas generating composition may be molded into a lump in a shape of a solid, a colloid substantial cylinder, a substantial column, an optionally polygonal column, or polygonal cylinder, by a method of charging a liquid, powdered or colloid gas generating composition into a predetermined space and drying, curing by reaction, compressing or gelating the same.

In addition, a fuel may be selected from HMX, 5-nitrotetrazole, 1H-tetrazole, 5-aminotetrazole, 1H-tetrazole-1,5-diamine, guanidine nitrate, monoaminoguanidine nitrate, carbodihydrazide, triaminoguanidine nitrate, 1,2,4-triazole-3-one, 5,5'-bi-1H-tetrazole, dicyandiamide, azodicarbonamide, glycine, semicarbazone, 1H-1,2,4-triazole-3,5-diamine, 4-aminoguanazole, and guanylurea nitrate, and the compounds shown in Table 1 or a mixture thereof. An oxidizing agent may be selected from ammonium perchlorate, sodium perchlorate, strontium perchlorate, potassium nitrate, ammonium nitrate, sodium nitrate, strontium nitrate, hydroxyammonium nitrate, ammonium hydrazide, dinitramide and aqueous hydrogen peroxide or a mixture thereof. Such a fuel and such an oxidizing agent can be used in combination for a gas generating agent composition.

TABLE 1

| Compounds |
|---|
| Carbon |
| Organic acid salts |
| Glycine |
| Copper oxalate |
| Nickel formate |
| Nitrobarbitolic acid |
| Nitrocellulose |
| Cellulose acetate |
| Polyacrylamide |
| Polyvinyl chloride |
| Polyvinyl tetrazole |
| Acetal resin |
| Hydrazodicarbonamide |
| Azodicarbonamide |
| Hydrazine complex metal nitrate |
| Carbon hydrazide complex metal nitrate |
| Semicarbazide complex metal nitrate |
| Ammine complex metal nitrate |
| Dicyanamide metal salt |
| Dicyandiamide |
| Nitroguanidine |
| Melamine |
| Guanidine nitrate - carbonate |
| Aminoguanidine nitrate |
| Triaminoguanidine nitrate |
| Cyanuric acid |
| Isocyanuric acid |
| Tetrazole and metal salts |
| 5-Aminotetrazole and metal salts |
| Bitetrazole and ammonium salt, metal salt |
| Azotetrazole |
| Bitetrazole amine |
| Triazole and derivatives |
| Urazole |
| 5-Nitro-1,2,4-triazolone-3 |
| RDX |
| Hexamethylene tetramine |
| Trihydrazinotriazine |
| Dinitroameline |
| Carboran |
| Metal nitrides |

Because the molded article of the gas generating composition 6 is caused to combust from the end surface 40, it is preferred that a gas generating agent with good ignition-combustion ability be used and it is also preferred that the molded article of the gas generating composition have a burning rate of 30 mm/sec or more under a pressure of 10 MPa;

The ignition enhancer 33 is attached so as to come into contact with the combustion starting end surface 40 of the molded article of the gas generating composition 6. The ignition enhancer 33 is obtained by dispersing a binder in boron potassium nitrate, preparing a colloidal slurry solution, coating on the combustion starting end surface 40, and drying. The ignition enhancer 33 may be also obtained by dispersing boron potassium nitrate or a gas generating agent having good ignition ability, that include a fuel such as nitroguanidine and an oxidizing agent such as strontium nitrate, into the molded article of the gas generating composition 6. Such ignition enhancer burns by itself and acts to increase further the combustion temperature of the molded article of the gas generating composition 6.

The surface heating element 36 is disposed in a state of contact with the surface of the ignition enhancer 33. In the surface heating element 36, a polyimide film is coated on just one surface of a stainless steel foil having a thickness of about 30 μm to obtain a coating thickness of about 20 μm, and the other surface of the stainless steel foil (surface in contact with the ignition enhancer 33) is left uncoated. The surface heating element 36 is connected to a power source via a relay connector 50 that relays the ignition electric current from the outside.

A space 25 is provided between the surface heating element 36 and relay connector 50. The cross sectional area of the space 25 in the radial direction (transverse direction) of the housing 3 is equal to or larger than the area of the surface heating element 36, and the spacing between the surface heating element 36 and relay connector 50 is sufficiently larger than the thickness of the surface heating element 36.

As for the method for attaching the surface heating element 36, the surface heating element 36 may be attached together with mounting the ignition enhancer 33 on the combustion starting end surface 40 (in this case, the surface heating element 36 is attached to the combustion starting end surface 40 by coating and drying the ignition enhancer 33) or separately from mounting the ignition enhancer 33; in such a case, for example, the surface heating element 36 may be attached to the ignition enhancer 33 by using a double-sided adhesive tape or a heat-resistant adhesive.

A coolant/filter 42 is installed to surround the cup 8, and an annular chamber 41 is defined between the cup 8 and coolant/filter 42. The coolant/filter 42 is formed by stacking plain steel wire meshes in the radial direction and compress-molding the meshes in the radial direction and axial direction. The coolant/filter 42 cools the combustion gas of the molded article of the gas generating composition 6 and traps the combustion residue.

A cylindrical gap 43 is defined between the circumferential wall portions 10, 47 of the housing and the coolant/filter 42. Owing to this cylindrical gap 43, the combustion gas passes through the entire region of the coolant/filter 42. Therefore, combustion gas is effectively cooled and purified.

The operation of the gas generator 100 shown in FIG. 1 will be described below. When an automobile collides, a sensor (not shown in the drawing) detects the impact and sends a signal to a control unit (not shown in the drawing). The control unit analyzes the signal, and if the control unit determines that a collision has occurred, it sends an actuation signal to a relay connector 50.

An electric current is supplied from the relay connector 50 via a lead wire 51 to the surface heating element 36, the entire surface heating element 36 emits heat, the ignition enhancer 33 is combusted, and the ignition and combustion of the combustion starting end surface 40 of the molded article of the gas generating composition 6 are started. The molded article of the gas generating composition 6 undergoes the end-surface combustion from the combustion starting end surface 40 to the opposite end surface 35.

At this time, having received the pressure of the combustion gas generated by the end-surface combustion, the surface heating element 36 separates from the combustion starting end surface 40, moves inside the space 25, and remains attached to the inner wall surface 30a of the annular portion 30 due to the subsequent increase in pressure inside the combustion chamber 7. As a result, the gas passage ports 26 serving as a gas discharge path are not closed by the surface heating element 36.

The generated combustion gas flows from the gas passage ports 26 into the annular chamber 41, is cooled and purified by the coolant/filter 42, then flows through the cylindrical gap 43 towards the gas discharge port 11 of the diffuser shell, fractures an aluminum tape 44 for moisture-proof, and is discharged.

Because the molded article of the gas generating composition 6 has three portions with different cross sectional areas that satisfy the following relationship, as represented by the size of the cross sectional area: a portion having an outer diameter A< an intermediate portion having an outer diameter between the outer diameter A and outer diameter B< a portion having an outer diameter B, when the end-surface combustion proceeds from the combustion starting end surface 40 to the opposite end surface 35, the amount of generated gas per unit time increases according to the increase in the cross sectional area.

Figure 2:
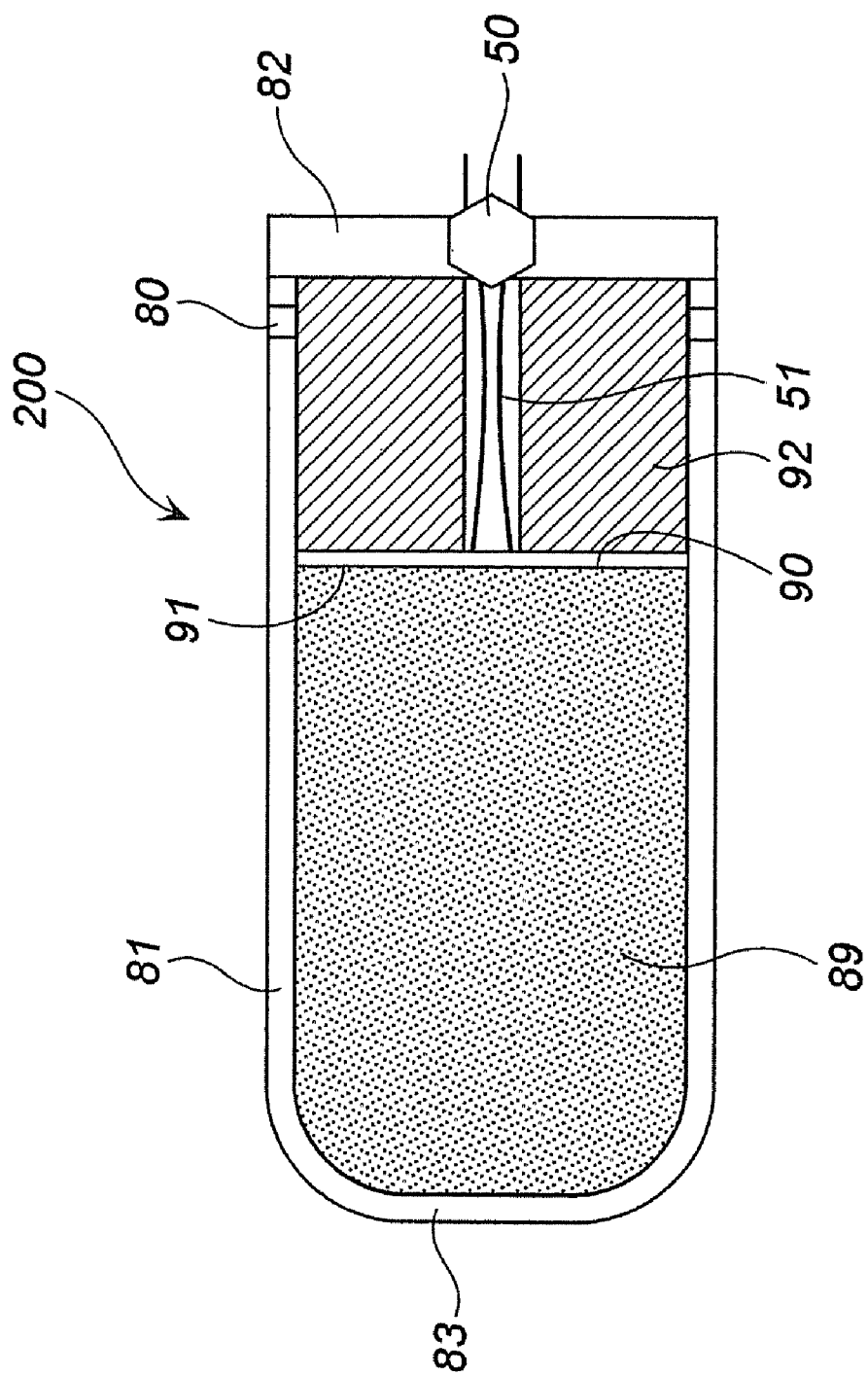
FIG. 2 shows a cross-sectional view of the gas generator for an air bag of another embodiment.

(2) Gas generator shown in FIG. 2

FIG. 2 is a cross-sectional view along the axial direction that illustrates the gas generator especially suitable for an airbag apparatus provided on the passenger side next to the driver.

The gas generator 200 is formed to have a cylindrical shape as a whole to be advantageously suitable for an airbag system for a passenger side. A housing 81 forming an outer container is in a cylindrical shape having a bottom such that one end thereof is closed (closing surface 83) and the opposite end portion is open. A closure 82 is attached to the open end side. A gas discharge port 80 closed by an aluminum tape for moisture-proof is formed on the side of the housing 81 where the closure 82 is attached, and a coolant/filter 92 is disposed therein.

In the internal space (combustion chamber) of the housing 81, a molded article of the gas generating composition 89, whose shape is identical to the internal space, is disposed. The molded article of the gas generating composition 89 has a composition identical to that of the molded article of the gas generating composition used in the gas generator shown in FIG. 1 and is obtained by the same method.

A combustion starting end surface 90 is formed in the molded article of the gas generating composition 89, and the entire surface thereof is covered with the surface heating element 91. The surface heating element 91 is attached by the same method as the surface heating element in the gas generator 100 shown in FIG. 1. The surface heating element 91 is connected to a power source via a connector 50 for relaying an ignition electric current from the outside.

In the gas generator 200, a signal is transmitted from the outside to the relay connector 50, an electric current flows from the relay connector 50 to the surface heating element 91 via a lead wire 51, the entire surface heating element 91 emits heat, and the ignition and combustion start on the entire combustion starting end surface 90 of the molded article of the gas generating composition 89. The molded article of the gas generating composition 89 undergoes end-surface combustion from the combustion starting end surface 90 toward the closed surface 83.

The generated combustion gas is cooled and purified by passing through the coolant/filter 92, fractures the aluminum tape for moisture-proof, and is discharged to the outside from the gas discharge port 80.

In the present embodiment, the gas passage to the gas discharge port 80 is obtained by at least partial burning and fracturing of the surface heating element 91 during combustion of the molded article of the gas generating composition 89.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing having a gas discharge port;
a molded article of gas generating composition disposed within the housing and generating gas on combustion, the molded article of the gas generating composition including an outer peripheral surface and a combustion starting end surface where ignition and combustion is started toward an opposite end surface thereto, the molded article of gas generating composition being provided such that the outer peripheral surface is in contact with an inner wall surface provided within the housing and the combustion starting end surface is open, not in contact with the inner wall surface; and
a surface heating element covering and being in contact with an entire surface of the combustion starting end surface.

2. The gas generator according to claim 1, wherein the outer peripheral surface is at least partially covered with a resin or a rubber.

3. The gas generator according to claim 1, wherein the molded article of the gas generating composition has a shape or structure with a combustion surface area changing during the combustion.

4. The gas generator according to claim 1, wherein the surface heating element is configured to deform in the thickness direction.

5. The gas generator according to claim 1, wherein the surface heating element is made from a material selected from nickel silicide, stainless steel foil, silicone rubber cord heater, electrically conductive rubber, composite ceramics based on titanium-based metal, carbon felt, synthetic rubber including electrically conductive carbon, and nichrome wire.

6. The gas generator according to claim 1, wherein the surface heating element has a shape identical or close to that of the combustion starting end surface.

7. The gas generator according to claim 1, wherein the combustion starting end surface further comprises an ignition enhancer.

8. The gas generator according to claim 1, wherein the inner wall surface is provided by the housing.

9. The gas generator according to claim 1, further comprising:
a cup-shaped member provided within the housing and including a closed end portion, a circumferential wall portion, and an open end portion,
wherein the molded article of gas generating composition is provided within the cup-shaped member such that the outer peripheral surface is in contact with the closed end portion and a circumferential wall portion, and the combustion starting end surface is open to the open end portion.

10. The gas generator according to claim 9, further comprising:
a filter accommodated inside the housing and outside the cup-shaped member.

11. The gas generator according to claim 9, wherein the cup-shaped member includes, in the circumferential wall portion, a smaller-diameter portion having a plurality of gas passage ports formed in a side of the open end portion and a larger-diameter portion formed in a side of the closed end portion.

12. The gas generator according to claim 11, wherein the molded article of gas generating composition is disposed at a first side of the surface heating element, and the plurality of gas passage ports are provided at a second side of the surface heat element opposite to the first side.

13. A gas generator, comprising:
a housing having a gas discharge port;
a molded article of gas generating composition disposed within the housing for generating gas on combustion, the molded article of the gas generating composition having a combustion starting end surface; and
ignition means provided within the housing for igniting and burning the molded article of the gas generating composition at the combustion end surface, the ignition means being a surface heating element in contact with the combustion starting end surface,
wherein a gas discharge path leading to the gas discharge port is opened by a change in the surface heating element after the combustion starting end surface is ignited and combusted.

* * * * *